F. A. BARROWS.
Plow.

No. 199,493. Patented Jan. 22, 1878.

WITNESSES
Nat. E. Oliphant
G. H. Oliphant

INVENTOR
Francis A. Barrows,
per
Chas. H. Fowler,
Attorney.

UNITED STATES PATENT OFFICE.

FRANCIS A. BARROWS, OF CASTLETON, VERMONT.

IMPROVEMENT IN PLOWS.

Specification forming part of Letters Patent No. 199,493, dated January 22, 1878; application filed December 28, 1877.

*To all whom it may concern:*

Be it known that I, FRANCIS A. BARROWS, of Castleton, in the county of Rutland and State of Vermont, have invented a new and valuable Improvement in Plows; and I do hereby declare that the following is a full, clear, and exact description of the construction and operation of the same, reference being had to the annexed drawings, making a part of this specification, and to the letters and figures of reference marked thereon.

Figure 1:
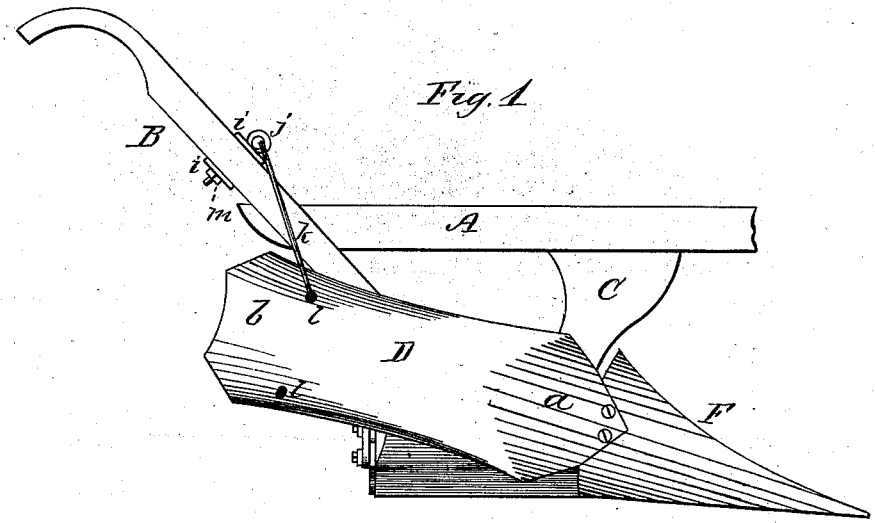
Figure 2:
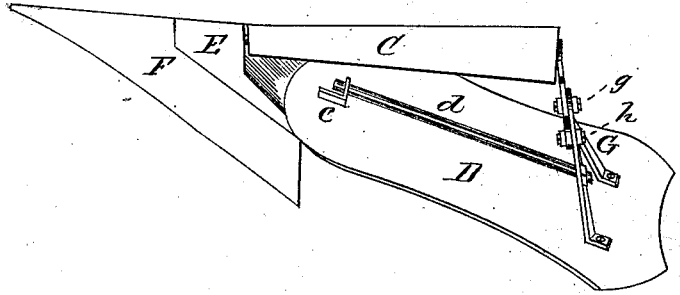
Figure 3:
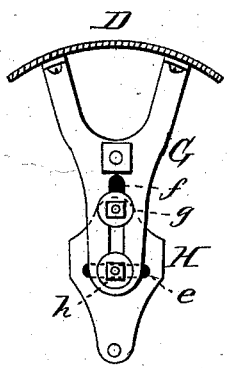

Figure 1 of the drawing is a representation of a side elevation of my invention. Fig. 2 is a plan view of the under side. Fig. 3 is a detail view of the crotch.

This invention has relation to swivel-plows, and has for its object to provide a plow simple in construction and effective in its purpose in turning a furrow on level land as well as on side hills; and consists in connecting the mold-board to the standard in a manner that will admit of the mold-board and plow-point being adjusted vertically and laterally to give the plow more land and pitch, as will be hereinafter more fully described.

In the accompanying drawings, A represents the plow-beam, to the forward end of which the draft is applied, in the usual manner; and B are the handles, secured to the beam and to a standard, C, by bolts or other suitable means, and having brace rods or bars connecting the handles, in the usual manner.

The mold-board D is formed upon its upper surface with a concavity, $a$, and a convexity, $b$, at opposite ends thereof, and the sub-point or block E has a corresponding concavity to receive the end of said mold-board and plow-point F, which is also concave upon its upper surface, the several parts being secured or connected together by suitable bolts. As the furrow-slice is received upon the point, and immediately it begins to turn, running on the curve of the mold-board, it enables the furrow-slice to make a true and easy turn, doing its work directly opposite of land-side, and bearing equally between the furrow and land, which gives easy draft and is perfectly easy to hold, the furrow bearing equally alike on the whole length of the mold-board, including the convexity $b$, which shape causes a nice and perfect furrow-slice to be turned.

To the under side of the mold-board D is a flange-plate, $c$, to which is secured one end of a brace-rod, $d$, the other end being connected by a screw-nut to a crotch-plate, G.

Pivoted to the heel of the standard C is a plate, H, having a longitudinal slot, $e$, and the plate G has a vertical slot, $f$. The two plates are connected together by screw-bolts and nuts $g$ $h$, the bolt $g$ passing through the vertical slot $f$ in the plate G, and through a hole formed in the upper end of the plate H, while the bolt $h$ passes through both the vertical and longitudinal slots in the plates.

It will be seen by this connection the mold-board and plow-point can be adjusted either laterally or vertically, and thereby give to the plow more or less land and pitch, or, in other words, to place the free end of the mold-board in any position which alters the position of the point.

This adjustment laterally gives more land on one side than the other, and the vertical adjustment gives it more or less pitch.

Two clamping-plates, $i$, are secured to the arms of the handles B, through which passes an eyebolt, $j$, to which is connected a rod, $k$, one end being bent to engage with either of the holes $l$ in the mold-board D.

The end of the bolt $j$ has screw-threads thereon, to receive a nut, $m$, by which means the rod $k$ can be adjusted to accommodate itself to the adjustability of the mold-board.

Having now fully described my invention, what I claim as new, and desire to secure by Letters Patent, is—

1. A mold-board of a plow, connected to the standard or heel thereof, substantially as specified, so that the mold-board will have both a vertical and lateral adjustment, substantially as and for the purpose set forth.

2. The mold-board D, having secured thereto plate G, with vertical slot $f$, in combination with the plate H, having longitudinal slot $e$, and the bolts and nuts $g$ $h$, substantially as and for the purpose specified.

In testimony that I claim the above I have hereunto subscribed my name in the presence of two witnesses.

FRANCIS A. BARROWS.

Witnesses:
MARTIN D. COLE,
JOHN M. CURRIER.